(12) United States Patent
Bao et al.

(10) Patent No.: US 9,940,448 B2
(45) Date of Patent: Apr. 10, 2018

(54) UNLOCK PROCESSING METHOD AND DEVICE

(71) Applicant: Xiaomi Inc., Beijing (CN)

(72) Inventors: Song Bao, Beijing (CN); Bin Zhang, Beijing (CN); Zhiyong Feng, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/457,394

(22) Filed: Aug. 12, 2014

(65) Prior Publication Data

US 2015/0089631 A1 Mar. 26, 2015

Related U.S. Application Data

(63) Continuation of application No. PCT/CN2014/077106, filed on May 9, 2014.

(30) Foreign Application Priority Data

Sep. 26, 2013 (CN) .......................... 2013 1 0446823

(51) Int. Cl.
*G06F 21/32* (2013.01)
*H04W 12/08* (2009.01)
*H04L 29/06* (2006.01)

(52) U.S. Cl.
CPC ............ *G06F 21/32* (2013.01); *H04W 12/08* (2013.01); *G06F 2221/2149* (2013.01); *H04L 63/0861* (2013.01)

(58) Field of Classification Search
None
See application file for complete search history.

(56) References Cited

U.S. PATENT DOCUMENTS

| 6,237,010 B1* | 5/2001 | Hui ......................... G06T 17/00 345/428 |
| 2005/0229151 A1 | 10/2005 | Gupta et al. |
| 2005/0272410 A1 | 12/2005 | Chen |
| 2006/0137198 A1* | 6/2006 | Cato ...................... G06F 1/3203 33/366.24 |
| 2007/0255946 A1 | 11/2007 | Kokubun |

(Continued)

FOREIGN PATENT DOCUMENTS

| CN | 101794188 A | 8/2010 |
| CN | 102075627 | 5/2011 |

(Continued)

OTHER PUBLICATIONS

International Search Report of PCT/CN2014/077106, mailed from the State Intellectual Property Office of China dated Aug. 12, 2014.

(Continued)

*Primary Examiner* — Henry Tsang
(74) *Attorney, Agent, or Firm* — Finnegan, Henderson, Farabow, Garrett & Dunner LLP

(57) ABSTRACT

An unlock processing method for a terminal, includes: receiving an input unlocking instruction from a user; determining whether the user belongs to a preset user group according to the unlocking instruction; and acquiring and storing information regarding the user, if it is determined that the user does not belong to the preset user group.

11 Claims, 15 Drawing Sheets

(56) References Cited

U.S. PATENT DOCUMENTS

| | | | |
|---|---|---|---|
| 2008/0267456 A1 | 10/2008 | Anderson | |
| 2010/0167753 A1 | 7/2010 | Das et al. | |
| 2010/0195875 A1 | 8/2010 | Iannone | |
| 2010/0235881 A1* | 9/2010 | Liu | G06F 21/6218 726/3 |
| 2012/0254646 A1* | 10/2012 | Lin | G06F 3/0488 713/323 |
| 2012/0291121 A1* | 11/2012 | Huang | G06F 21/36 726/19 |
| 2014/0007223 A1* | 1/2014 | Han | G06F 21/32 726/16 |
| 2014/0033298 A1* | 1/2014 | Park | G06F 21/32 726/17 |
| 2014/0123273 A1* | 5/2014 | Matus | G06F 21/32 726/17 |

FOREIGN PATENT DOCUMENTS

| | | |
|---|---|---|
| CN | 102457619 | 5/2012 |
| CN | 102932540 | 2/2013 |
| CN | 103051799 | 4/2013 |
| CN | 103108082 | 5/2013 |
| CN | 103488924 | 1/2014 |
| JP | 2003-169371 | 6/2003 |
| JP | 2005229151 | 8/2005 |
| JP | 2006-060685 | 3/2006 |
| JP | 2007-067782 | 3/2007 |
| JP | 2007-195063 | 8/2007 |
| JP | 2009-129419 | 6/2009 |
| JP | 2010-086281 | 4/2010 |
| JP | 2011-049876 | 3/2011 |
| RU | 2359311 C2 | 6/2009 |
| WO | WO 2013/128510 | 6/2013 |

OTHER PUBLICATIONS

European Search Report for Application No. 14184841.6, from the European Patent Office, dated Jan. 23, 2015.

"Android-App fotografiert Dieb," heise online news, dated Jan. 26, 2013. Retrieved from the Internet on Jan. 8, 2015. URL: http://www.heise.dejnewstickerjmeldung/Android-App-fotografiert-Dieb-1792137.html.

"Settings and Function Description of Anti-lost Application Program for Molock Smart Phone," dated Aug. 24, 2011. Retrieved from the Internet on Aug. 18, 2015. URL: http://blog.naver.com/phia6609/40137277987.

"Settings of Guest Mode for LG G2 Mobile Phone," dated Aug. 25, 2013. Retrieved from the Internet on Aug. 18, 2015. URL: http://tinyra.in/10175051901.

English version of International Search Report of PCT/CN2014/077106, mailed from the State Intellectual Property Office of China dated Aug. 12, 2014.

Examination Report for European Application No. 14184841.6, from the European Patent Office, dated Mar. 21, 2016.

English version of "Android-App fotografiert Dieb," heise online news, dated Jan. 26, 2013. URL: http://www.heise.dejnewstickerjmeldung/Android-App-fotografiert-Dieb-1792137.html.

Notification on Results of Estimation for Patentability of Invention for Russian Application No. 2015125464/08(039614), dated Aug. 16, 2016.

* cited by examiner

UNLOCK PROCESSING METHOD AND DEVICE

CROSS REFERENCE TO RELATED APPLICATION

This application is a continuation of International Application No. PCT/CN2014/077106, filed May 9, 2014, which is based upon and claims priority to Chinese Patent Application No. CN 201310446823.2, filed Sep. 26, 2013, the entire contents of all of which are incorporated herein by reference.

TECHNICAL FIELD

The present disclosure generally relates to the technology field of electronic devices and, more particularly, to an unlock processing method and device.

BACKGROUND

A terminal, such as a mobile phone or a tablet computer, may be used to store a large quantity of data including private information of a user, such as the owner of the terminal. The terminal generally can be locked to prevent unauthorized use and to provide protection of the private information.

Conventional unlocking methods for the terminal include a numeric password, squared figures, fingerprint recognition, voice recognition, and face recognition. Although those methods may provide protection for the locked terminal, when a second user other than the owner tries to unlock the terminal, the conventional unlocking methods may only prompt the second user that an incorrect password has been inputted and request for another password input, and generally will not provide additional information. Also, the owner generally will not find out that the second user has tried to unlock the terminal, which may be a potential security risk for the terminal.

SUMMARY

According to a first aspect of the present disclosure, there is provided an unlock processing method for a terminal, comprising: receiving an input unlocking instruction from a user; determining whether the user belongs to a preset user group according to the unlocking instruction; and acquiring and storing information regarding the user, if it is determined that the user does not belong to the preset user group.

According to a second aspect of the present disclosure, there is provided a terminal, comprising: a processor; and a memory for storing instructions executable by the processor, wherein the processor is configured to: receive an input unlocking instruction from a user; determine whether the user belongs to a preset user group according to the unlocking instruction; and acquire and store information regarding the user, if it is determined that the user does not belong to the preset user group.

According to a third aspect of the present disclosure, there is provided a non-transitory storage medium having stored therein instructions that, when executed by a processor of a terminal, cause the terminal to perform an unlock processing method, the method comprising: receiving an input unlocking instruction from a user; determining whether the user belongs to a preset user group according to the unlocking instruction; and acquiring and storing information regarding the user, if it is determined that the user does not belong to the preset user group.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

In exemplary embodiments, there is provided an unlock processing method for a terminal. For example, when a user not belonging to a preset user group tries to unlock the terminal, not only the terminal will not be unlocked, but also an information acquisition device of the terminal can be started to acquire information regarding the unlocking user. Thereby, the method may provide a notice for, e.g., an owner of the terminal to check previous unlocking information, after the owner unlocks the terminal, regarding who has tried to unlock the terminal.

Figure 1:
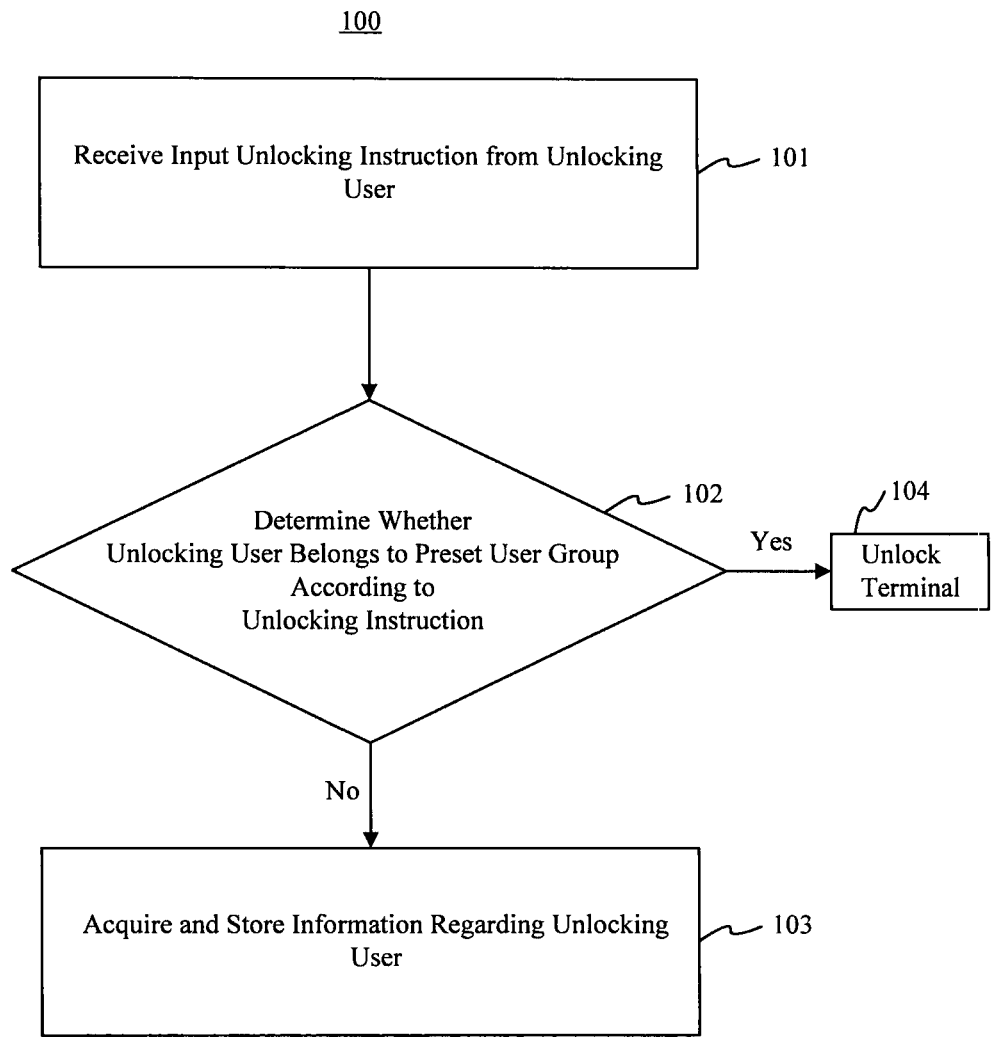
FIG. 1 is a flowchart of an unlock processing method for a terminal, according to an exemplary embodiment.

FIG. 1 is a flowchart of an unlock processing method 100 for a terminal, according to an embodiment. Referring to FIG. 1, the method 100 includes the following steps.

In step 101, the terminal receives an input unlocking instruction from a user trying to unlock the terminal, referred to hereafter as the unlocking user.

In step 102, the terminal determines whether the unlocking user belongs to a preset user group according to the unlocking instruction. For example, the preset user group may include one or more users that are preset to have a full use permission of the terminal, such as an owner of the terminal.

In step 103, if it is determined that the unlocking user does not belong to the preset user group, the terminal acquires and stores information regarding the unlocking user.

In step 104, if it is determined that the unlocking user belongs to the preset user group, the terminal is unlocked to display, e.g., a home page.

In exemplary embodiments, the unlocking instruction is input through a displayed unlocking interface by the unlocking user. The unlocking instruction is based on information of a password, a pattern, or biological recognition information, including a preset numeric password, a particular pattern, a face image, voice information, fingerprint information, etc. Taking a numeric password for example, if the unlocking user is an unauthorized user, the password input by the unlocking user generally does not match the preset password, the terminal thus determines that the unlocking user is an unauthorized user of the terminal upon receipt of the incorrect password. The terminal also acquires and stores information regarding the unlocking user for, e.g., an owner of the terminal to check who has tried to unlock the terminal after the owner unlocks the terminal.

Figure 2:
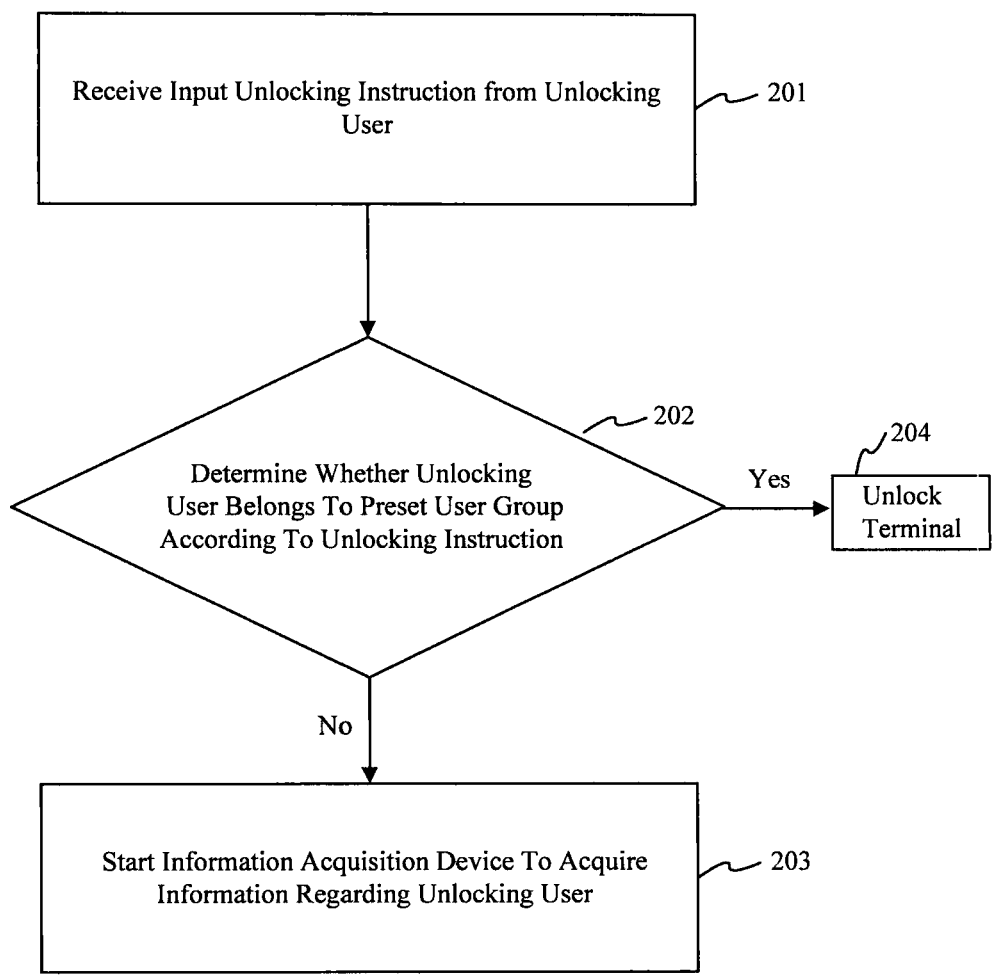
FIG. 2 is a flowchart of an unlock processing method for a terminal, according to an exemplary embodiment.

In exemplary embodiments, an information acquisition device may be used to acquire information regarding the unlocking user. FIG. 2 is a flowchart of an unlock processing method 200 for a terminal, according to another embodiment. Referring to FIG. 2, the method 200 includes the following steps.

In step 201, the terminal receives an unlocking instruction from an unlocking user.

In step 202, the terminal determines whether the unlocking user belongs to a preset user group according to the unlocking instruction. For example, the preset user group may include one or more users that are preset to have a full use permission of the terminal, such as an owner of the terminal. If the unlocking user does not belong to the preset user group, the terminal performs step 203; otherwise, in step 204, the terminal is unlocked, e.g., to display a home page.

In step 203, if the unlocking user does not belong to the preset user group, an information acquisition device of the terminal is started to acquire information regarding the unlocking user. For example, the information regarding the unlocking user includes the unlocking user's face image information, voice information, fingerprint information, etc.

In exemplary embodiments, the information acquisition device of the terminal may include a camera, a microphone, a fingerprint recording device, etc. Taking a camera for example, if the unlocking user inputs an incorrect unlocking instruction, the terminal starts the camera, adjusts the camera toward the unlocking user in front of a screen of the terminal to capture a picture, and stores the picture in the terminal or in a cloud storage. The owner of the terminal may recognize the identity of the unlocking user based on the picture upon checking on the picture. In addition, if the unlocking instruction of the terminal is based on biological recognition technology, a microphone or a fingerprint recording device may be utilized to record voice information or fingerprint information of the unlocking user. Also, the identity of the unlocking user may be determined by comparing the recorded voice information or fingerprint information with existing voice information or fingerprint information, respectively.

Figure 3:
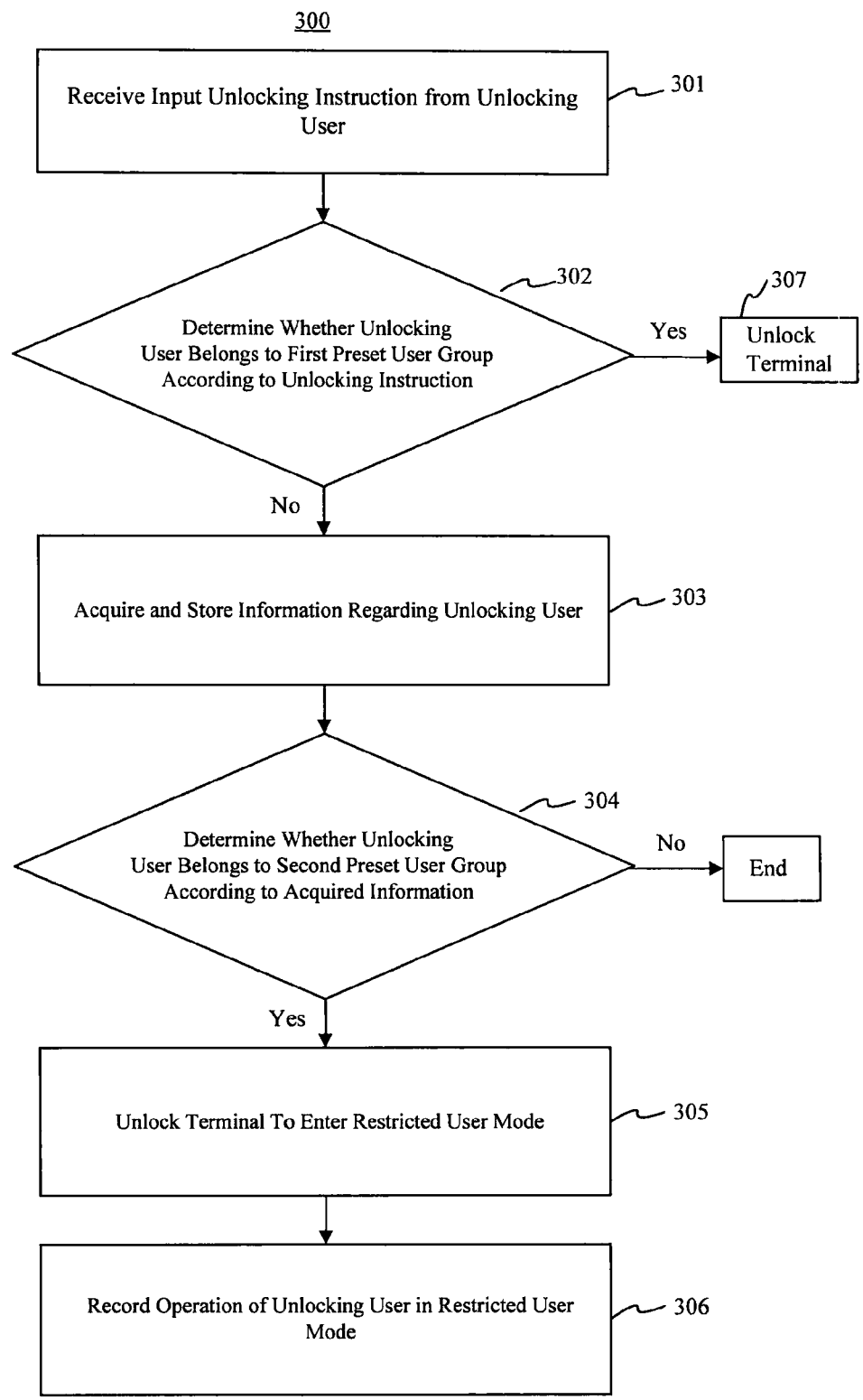
FIG. 3 is a flowchart of an unlock processing method for a terminal, according to an exemplary embodiment.

In exemplary embodiments, an additional determination mechanism may be provided for the unlocking user, in order to identify particular users such as family members and friends of the owner of the terminal, and to provide corresponding permission for the particular users to unlock the terminal. FIG. 3 is a flowchart of an unlock processing method 300 for a terminal, according to an exemplary embodiment. Referring to FIG. 3, the method 300 includes the following steps.

In step 301, the terminal receives an input unlocking instruction from an unlocking user.

In step 302, the terminal determines whether the unlocking user belongs to a first preset user group according to the unlocking instruction. For example, the first preset user group may include one or more users that are preset to have a full use permission of the terminal, such as an owner of the terminal. If it is determined that the unlocking user does not belong to the first preset user group, the terminal performs step 303; otherwise, in step 307, the terminal is unlocked to display, e.g., a home page.

In step 303, if it is determined that the unlocking user does not belong to the first preset user group, the terminal acquires and stores information regarding the unlocking user.

In step 304, the terminal further determines whether the unlocking user belongs to a second preset user group according to the acquired information regarding the unlocking user. For example, the second preset user group may include one or more particular users that are preset to have a limited use permission of the terminal, such as family members or friends of the owner of the terminal. If it is determined that the unlocking user belongs to the second preset user group, the terminal performs step 305; otherwise, the method 300 ends.

In step 305, if it is determined that the unlocking user belongs to the second preset user group, the terminal is unlocked and enters a restricted user mode.

In step 306, the terminal records an operation of the unlocking user in the restricted user mode.

In exemplary embodiments, in the restricted user mode, the terminal, including applications installed on the terminal, only responds to preset operations, such as start, inquiry, modification, addition, or deletion.

In the illustrated embodiment, if the owner of the terminal wants family members or friends to have permission to use the terminal, the owner of the terminal may have, e.g., biological recognition information of the family members or friends registered in advance for them to unlock the terminal. Taking a child of the owner for example, a picture of the child may be stored locally on the terminal. When the child tries to unlock the terminal but inputs an incorrect password, the camera of the terminal will capture a picture of the child, and the terminal further compares the captured picture with one or more pictures stored in the terminal in advance, including the picture of the child. Based on the comparison, if the terminal determines that the unlocking user belongs to the second preset user group through a face recognition technology, the terminal will be unlocked.

In exemplary embodiments, different user modes may be set for different particular users, such as a family member or a friend, in advance, in which a particular user can unlock the terminal, but only to perform operations restricted to that particular user. Still taking the child of the owner of the terminal for example, a user mode for the child is set in advance. After the terminal is unlocked to enter the user mode, for example, only applications of games are available, while applications of purchases, modification operations, addition operations, or deletion operations are not available, to prevent the child from making any purchases or the other operations. Because different user modes may be set for different particular users by the owner of the terminal, privacy information may be set as inaccessible to protect the privacy information. In some embodiments, a full use permission may also be set for a particular user.

In exemplary embodiments, the terminal records operations including, e.g., start, inquiry, modification, addition, deletion, etc., performed by a particular user to the terminal, including applications installed on the terminal device.

Figure 4:
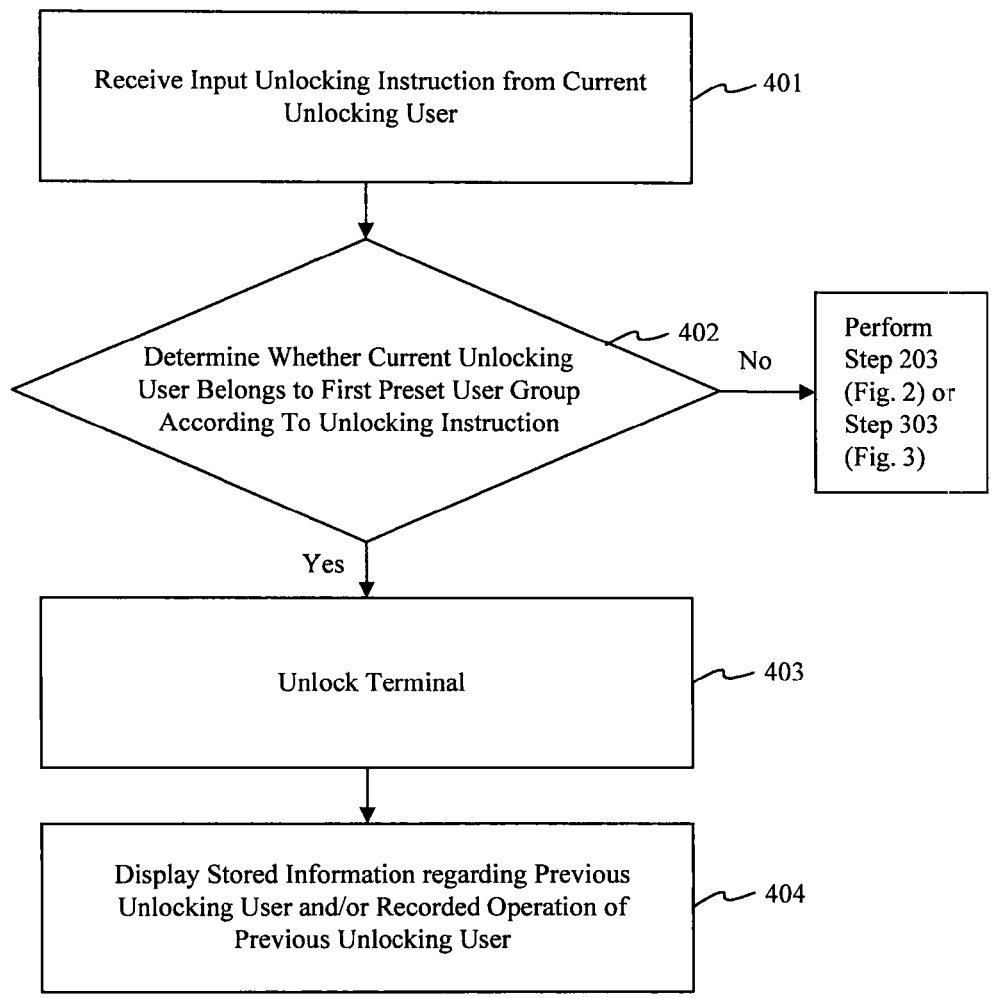
FIG. 4 is a flowchart of an unlock processing method for a terminal, according to an exemplary embodiment.

In exemplary embodiments, the terminal displays information regarding an unlocking user to the owner of the terminal after the owner unlocks the terminal. FIG. 4 is a flowchart of an unlock processing method 400 for a terminal, according to another embodiment. Referring to FIG. 4, the method 400 includes the following steps.

In step 401, the terminal receives an input unlocking instruction from a current unlocking user.

In step 402, the terminal determines whether the current unlocking user belongs to a first preset user group according to the unlocking instruction. For example, the first preset user group may include one or more users that are preset to have a full use permission of the terminal, such as an owner of the terminal. If the current unlocking user belongs to the first preset user group, the terminal performs step 403; otherwise, the terminal may further perform step 203 (FIG. 2) or step 303 (FIG. 3).

In step 403, if it is determined that the current unlocking user belongs to the first preset user group, the terminal is unlocked.

In step 404, the terminal displays stored information regarding a previous unlocking user not belonging to the first preset user group and/or recorded operations of the previous unlocking user. For example, the stored information regarding the previous unlocking user includes face image information, voice information, or fingerprint information of the previous unlocking user. Also for example, the recorded operations include start, inquiry, modification, addition, or deletion performed by the previous unlocking user to the terminal, including applications installed on the terminal, in the restricted user mode.

In exemplary embodiments, when the terminal is unlocked after the owner inputs a correct unlocking instruction, and a normal user mode is entered, the terminal displays to the owner acquired information regarding one or more previous unlocking users other than the owner, for example, captured pictures, recorded voices, or received fingerprints, etc. If there is a particular user preset by the owner among the previous unlocking users, the terminal also displays a record of operations performed by the particular user to the terminal.

Figure 5:
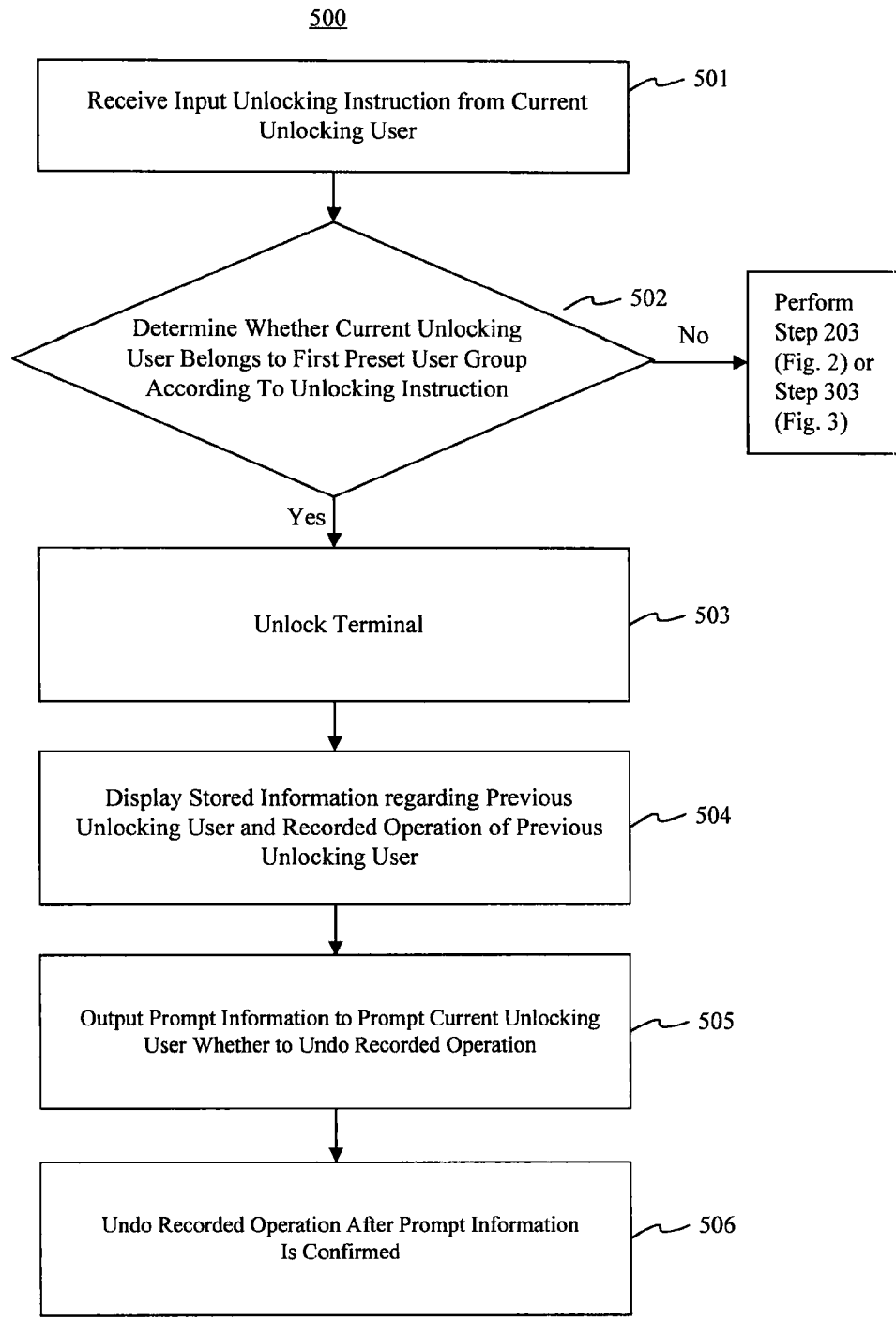
FIG. 5 is a flowchart of an unlock processing method for a terminal, according to an exemplary embodiment.

In exemplary embodiments, an operation by the particular user to the terminal may be undone. FIG. 5 is a flowchart of an unlock processing method 500 for a terminal, according to an exemplary embodiment. Referring to FIG. 5, the method 500 includes the following steps.

In step 501, the terminal receives an input unlocking instruction from a current unlocking user.

In step 502, the terminal determines whether the current unlocking user belongs to a first preset user group according to the unlocking instruction. For example, the first preset user group may include one or more particular users that are preset to have a full use permission of the terminal, such as an owner of the terminal. If it is determined that the current unlocking user belongs to the first preset user group, the terminal performs step 503; otherwise, the terminal may further perform step 203 (FIG. 2) or step 303 (FIG. 3).

In step 503, if it is determined that the current unlocking user belongs to the first preset user group, the terminal is unlocked.

In step 504, the terminal displays stored information regarding a previous unlocking user who does not belong to the first preset user group and is a particular user preset by the current user, and a recorded operation of the previous unlocking user.

In step 505, the terminal outputs prompt information to prompt the current unlocking user whether to undo the recorded operation.

In step 506, the terminal undoes the recorded operation after the prompt information is confirmed.

In exemplary embodiments, the terminal can undo the operation performed by the particular user to the terminal to restore to a previous status, by prompting the owner for an undo option after recording the operation by the particular user, and restoring to the previous status after the owner selects the undo option. For example, a girlfriend of the owner can be preset as a particular user, and a restricted user mode is entered after the terminal is unlocked by the girlfriend, in which she loads a map application on the terminal, deletes a weather forecast application, and modifies a setup of an avatar for an instant communication application. When the owner subsequently unlocks the terminal, he finds out the above operations performed by his girlfriend, and selects an undo option, e.g., "confirm to undo," in a dialog box that is popped out to prompt whether to undo the operations. Accordingly, the map application is deleted, the weather forecast application is restored, and the setup of the avatar for the instant communication application is also restored, that is, the terminal is restored to the status prior to the operations by the girlfriend. In some embodiments, the terminal may be restored to the previous status with one key being pressed, or the operations may be selectively undone one by one.

In exemplary embodiments, after the owner unlocks the terminal, the terminal displays only information regarding unlocking users other than the owner acquired by the terminal between a last unlocking by the owner and the current unlocking by the owner. Historical information earlier than the last unlocking by the owner may be displayed through inquiring. Accordingly, the owner can quickly grasp recent unlocking events.

Figure 6:
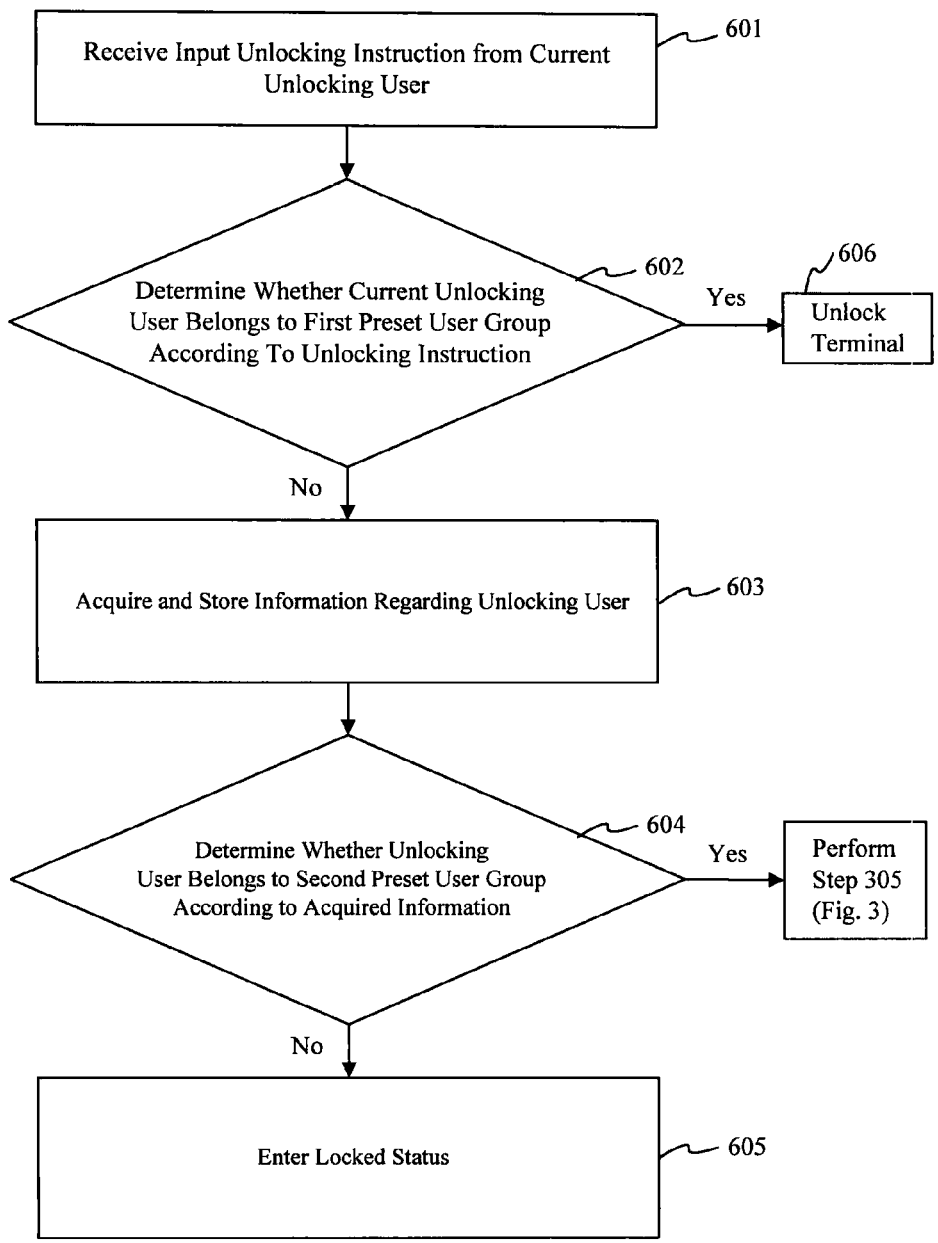
FIG. 6 is a flowchart of an unlock processing method for a terminal, according to an exemplary embodiment.

In exemplary embodiments, the terminal may make an additional determination on the identity of a current unlocking user. FIG. 6 is a flowchart of an unlock processing method 600, according to an exemplary embodiment. Referring to FIG. 6, the method 600 includes the following steps.

In step 601, the terminal receives an input unlocking instruction from a current unlocking user.

In step 602, the terminal determines whether the current unlocking user belongs to a first preset user group according to the unlocking instruction. For example, the first preset user group may include one or more particular users that are preset to have a full use permission of the terminal, such as an owner of the terminal. If it is determined that the current unlocking user does not belong to the first preset user group, the terminal performs step 603; otherwise, in step 606, the terminal may be unlocked to display, e.g., a home page.

In step 603, if it is determined that the current unlocking user does not belong to the first preset user group, the terminal acquires and stores information regarding the current unlocking user.

In step 604, the terminal determines whether the current unlocking user belongs to a second preset user group according to the acquired information regarding the current unlocking user. For example, the second preset user group may include one or more particular users that are preset to have a limited use permission of the terminal, such as family members or friends of the owner of the terminal. If the current unlocking user belongs to the second preset user group, the terminal performs step 605; otherwise, the terminal may further perform step 305 (FIG. 3).

In step 605, if it is determined that the current unlocking user does not belong to the second preset user group, the terminal enters a locked status.

In the above embodiment, for the unlocking user who is not the owner or a particular user, the terminal acquires and stores identification information but is not unlocked.

In exemplary embodiments, the terminal determines when to display an unlocking interface based on an inclined angle of the terminal. For example, before the input unlocking instruction is received, the terminal determines an inclined angle between a plane where an axis of the terminal is located and a horizontal plane. If the inclined angle is greater than or equals to a preset threshold, the terminal displays the unlocking interface.

Figure 7:
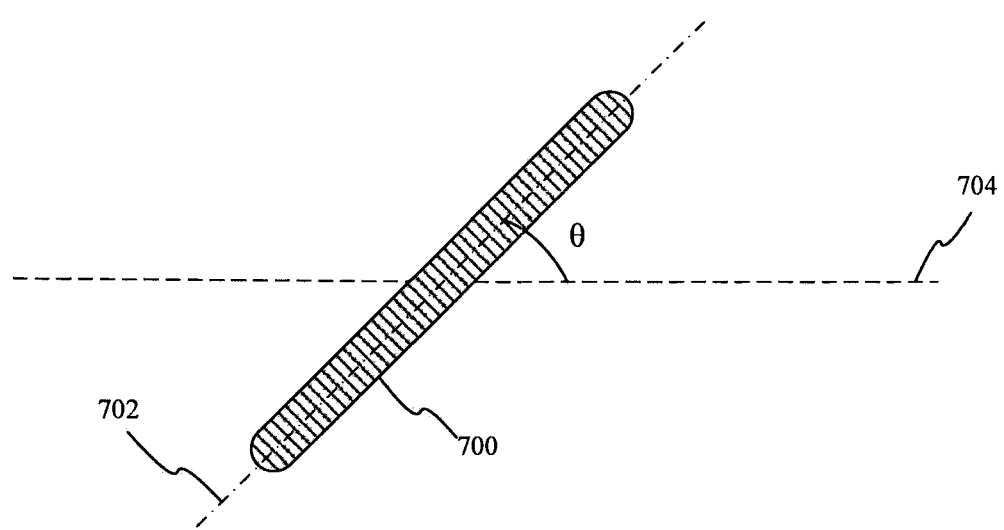
FIG. 7 is a side view of an inclined angle of a terminal, according to an exemplary embodiment.

FIG. 7 is a side view of an inclined angle of a terminal 700, according to an exemplary embodiment. Referring to FIG. 7, an included angle θ is between a plane 702 where an axis of the terminal 700 is located and a horizontal plane 704, and has a value between 0° and 180°. When an unlocking user picks up the terminal 700, the terminal 700 automatically detects the value of θ. If the value of θ reaches a preset threshold (for example, 30°, 60°, 90°, etc.), the unlocking interface is displayed to receive the unlocking instruction input by the unlocking user. In this manner, the unlocking interface is displayed by the unlocking user's changing of a placing direction of the terminal 700 without a mechanical operation, which is convenient for the use and the user experience is improved.

In exemplary embodiments, the terminal may be a mobile phone, a tablet computer, an e-book reader, a wearable device, etc. The unlocking interface may be displayed after the value of θ is greater than or equals to the preset threshold and remains for a preset time interval, for example, θ is 90° for five seconds or more, to avoid inadvertent display of the unlocking interface caused by a random placement of the terminal.

Figure 8:
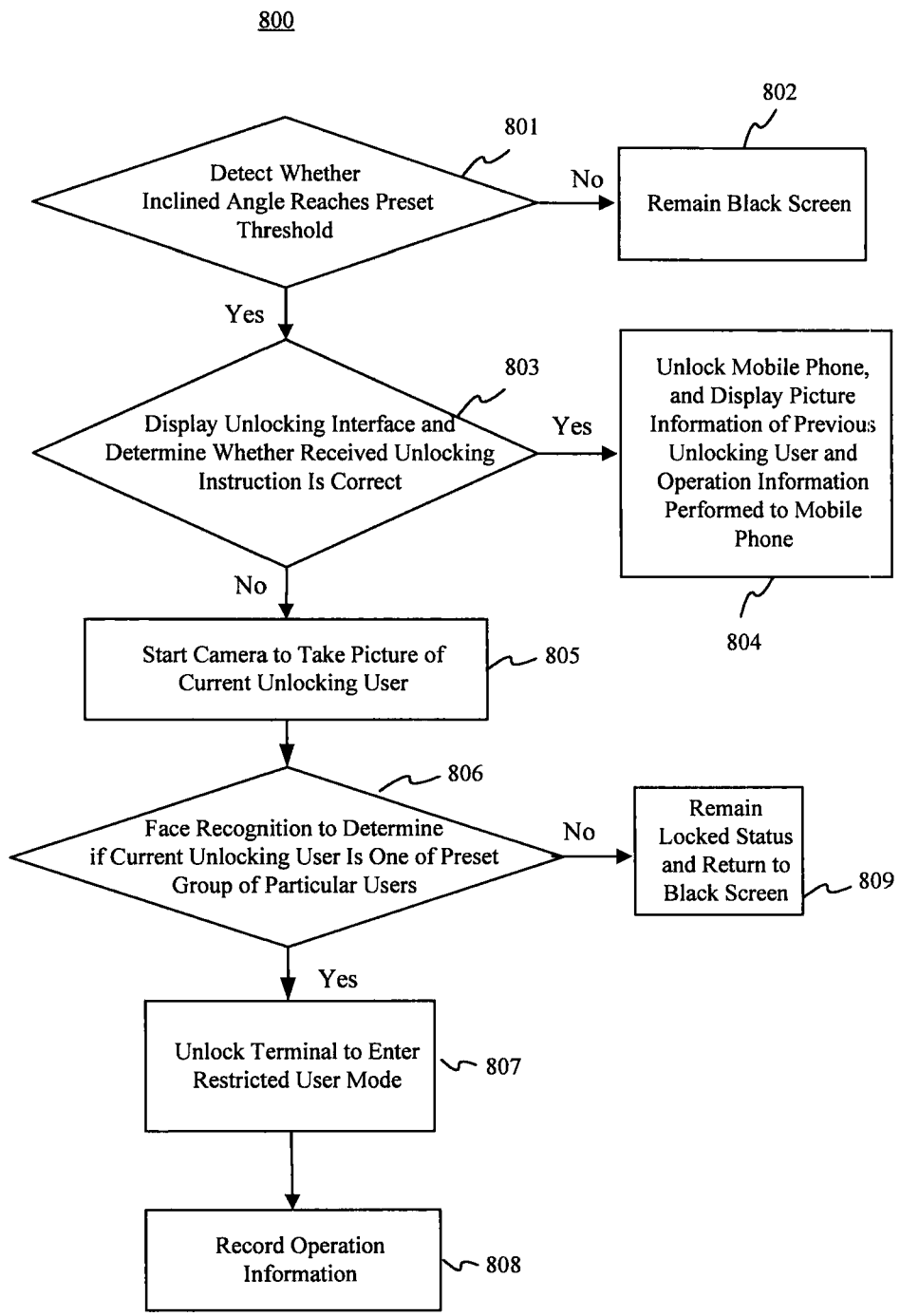
FIG. 8 is a flowchart of an unlock processing method for a mobile phone with a face recognition function, according to an exemplary embodiment.

FIG. 8 is a flowchart of an unlock processing method 800 for a terminal, such as a mobile phone, with a face recognition function, according to an embodiment. Referring to FIG. 8, when a user picks up the mobile phone, the mobile phone may be inclined to an angle that reaches a preset threshold and remains for, e.g., five seconds. The mobile phone detects whether the inclined angle reaches the preset threshold (step 801). If it is detected that the inclined angle does not reach the preset threshold, the mobile phone remains, e.g., a black screen (step 802). If it is detected that the inclined angle reaches the preset threshold, an unlocking interface is displayed for receiving an input unlocking instruction, and it is determined whether the received unlocking instruction is correct (step 803). If the unlocking instruction is correct, the mobile phone is unlocked, and may be used as normal. If anyone has tried to unlock the mobile phone previously, picture information of the previous unlocking user and operation information performed to the mobile phone are displayed (step 804). Also, the mobile phone may provide an undo option with one key to be pressed. If the unlocking instruction is not correct, which suggests that the current unlocking user is an unauthorized user, a camera is started to take a picture of the face of the current unlocking user (step 805). The captured picture is compared with pictures of a preset user group of particular users by utilizing the face recognition technology (step 806), to determine if the current unlocking user is one of a preset group of particular users. If it is determined that the current unlocking user is one of the preset group of particular users, the terminal is unlocked to enter a restricted user mode corresponding to the current unlocking user (step 807), and operation information of the particular user is recorded (step 808). In some embodiments, there are multiple, such as three, preset groups of particular users. Accordingly, the mobile phone may have multiple restricted user modes, correspondingly. If it is determined that the current unlocking user is not a particular user, the mobile phone remains in the locked status and returns to the black screen (step 809).

Figure 9:
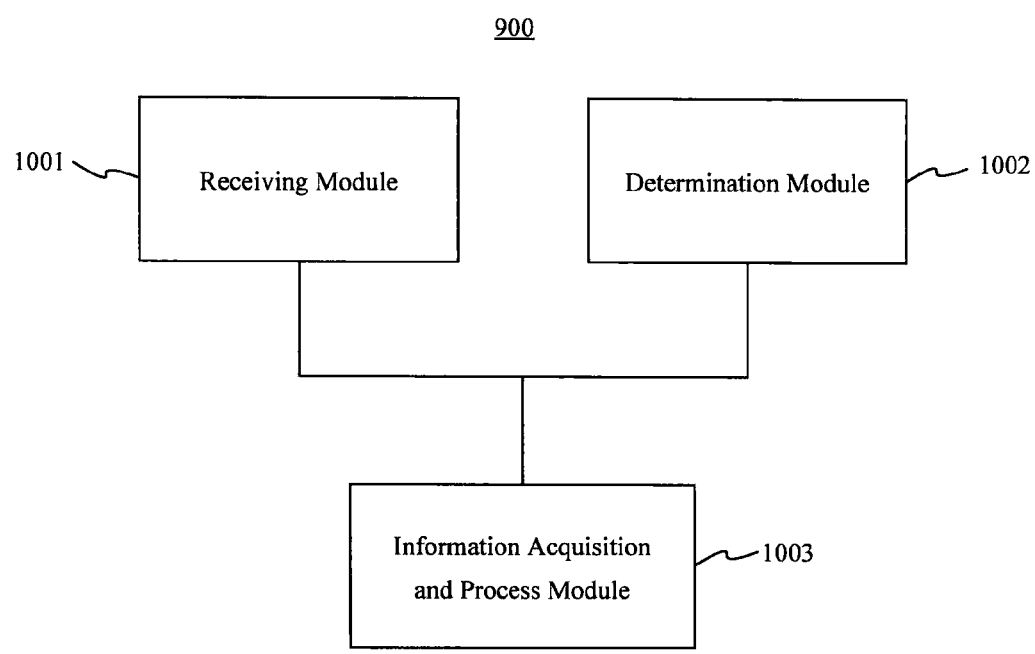
FIG. 9 is a block diagram of an unlock processing apparatus for a terminal, according to an exemplary embodiment.

FIG. 9 is a block diagram of an unlock processing apparatus for a terminal, according to an exemplary embodiment. Referring to FIG. 9, the apparatus 900 includes a receiving module 1001 configured to receive an input unlocking instruction from an unlocking user, a determination module 1002 configured to determine whether the unlocking user belongs to a preset user group according to the unlocking instruction, and an information acquisition and process module 1003 configured to acquire and store information regarding the unlocking user if it is determined that the unlocking user does not belong to the preset user group.

Figure 10:
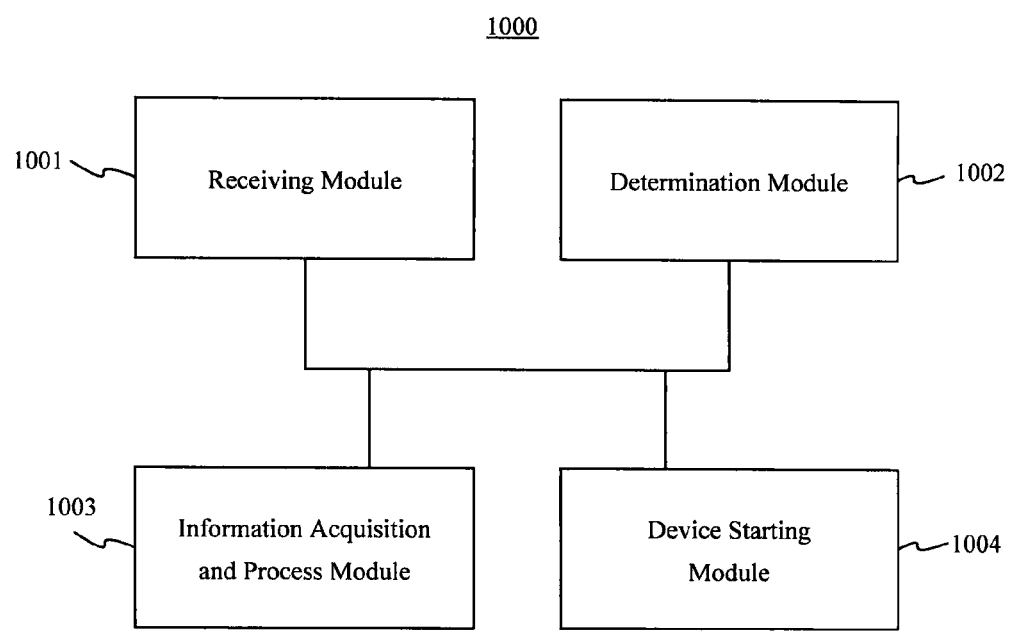
FIG. 10 is a block diagram of an unlock processing apparatus for a terminal, according to an exemplary embodiment.

FIG. 10 is a block diagram of an unlock processing apparatus 1000 for a terminal, according to an exemplary embodiment. Referring to FIG. 10, the apparatus 1000 further includes a device starting module 1004 in addition to the receiving module 1001, the determination module 1002, and the information acquisition and process module 1003 (FIG. 9). The device starting module 1004 is configured to start an information acquisition device if it is determined that the current unlocking user does not belong to the preset user group. For example, the information acquisition device may be a camera, a microphone, a fingerprint recording device, etc. The information acquisition device acquires face image information, voice information and fingerprint information, etc. regarding the current unlocking user after being started.

Figure 11:
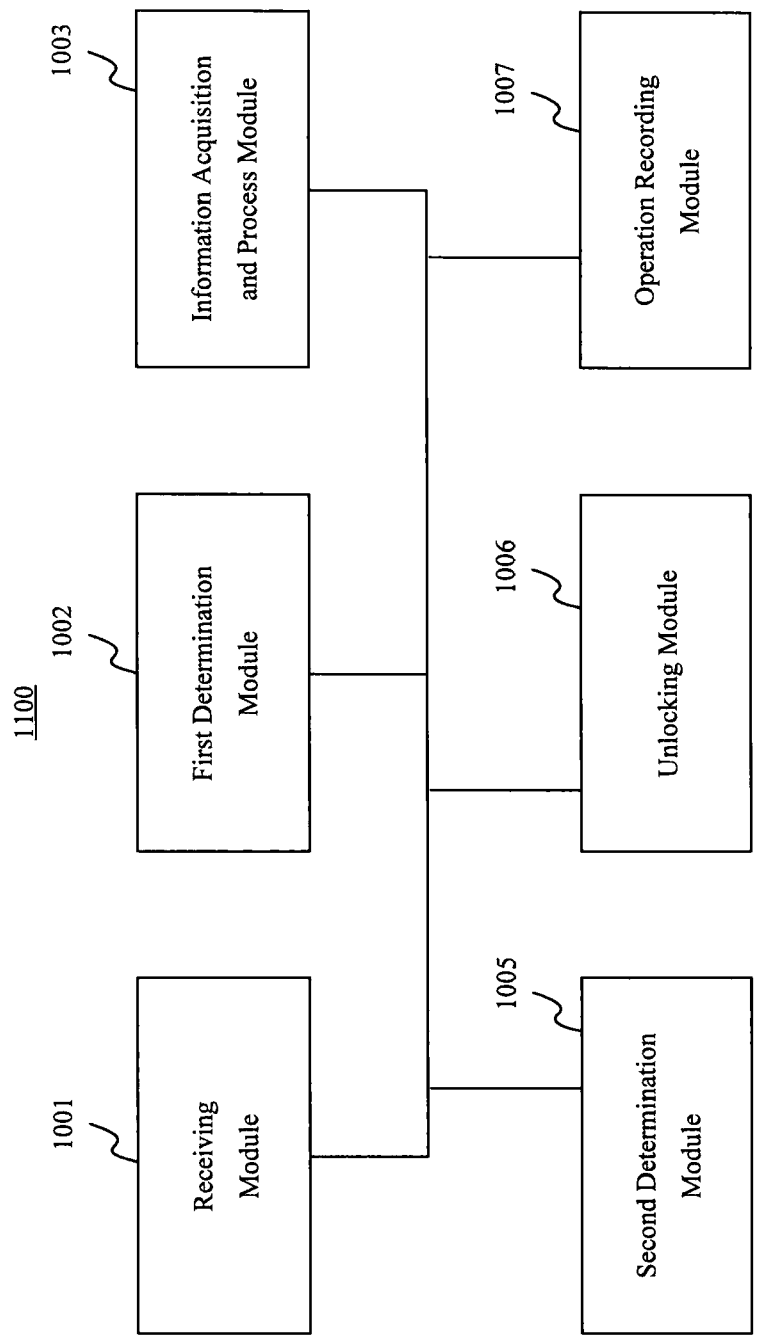
FIG. 11 is a block diagram of an unlock processing apparatus for a terminal, according to an exemplary embodiment.

FIG. 11 is a block diagram of an unlock processing apparatus 1100 for a terminal, according to an exemplary embodiment. Referring to FIG. 11 the unlock processing apparatus 1100 further includes a second determination module 1005, an unlocking module 1006, and an operation recording module 1007, in addition to the receiving module 1001, the determination module 1002 as the first determination module, and the information acquisition and process module 1003 (FIG. 9).

The second determination module 1005 is configured to determine whether the current unlocking user belongs to a second preset user group according to the acquired information regarding the current unlocking user.

The unlocking module 1006 is configured to unlock the terminal to enter a restricted user mode, if the current unlocking user belongs to the second preset user group. For example, in the restricted user mode, the terminal, including applications installed on the terminal, only responds to preset operations such as start, inquiry, modification, addition, deletion, etc.

The operation recording module 1007 is configured to record an operation of the current unlocking user in the restricted user mode.

Figure 12:
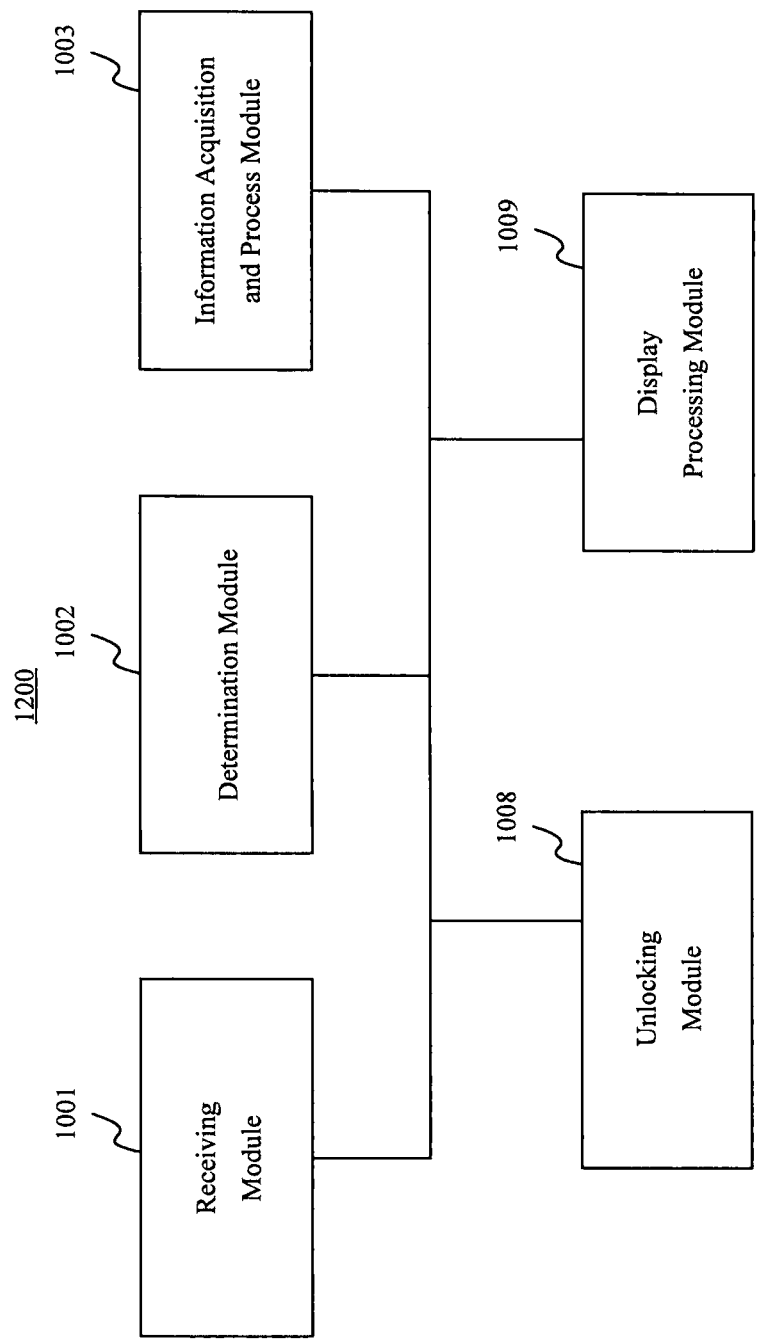
FIG. 12 is a block diagram of an unlock processing apparatus for a terminal, according to an exemplary embodiment.

FIG. 12 is a block diagram of an unlock processing apparatus 1200 for a terminal, according to an exemplary embodiment. Referring to FIG. 12, the unlock processing apparatus 12 further includes an unlocking module 1008 and a display processing module 1009, in addition to the receiving module 1001, the determination module 1002, and the information acquisition and process module 1003 (FIG. 9).

The unlocking module 1008 is configured to unlock the terminal if the current unlocking user belongs to the first preset user group. The display processing module 1009 is configured to display the acquired information regarding the unlocking user who does not belong to the first preset user group.

Figure 13:
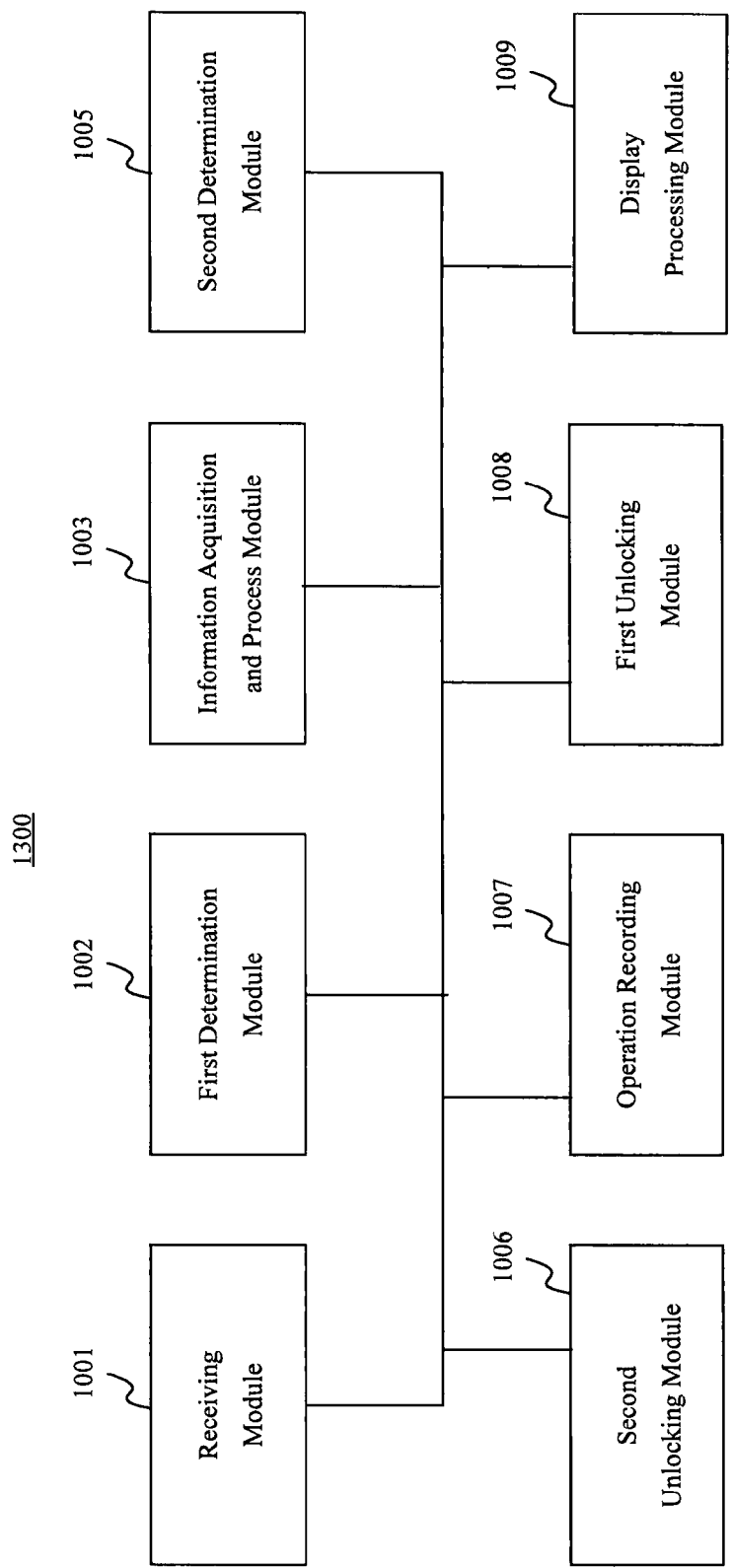
FIG. 13 is a block diagram of an unlock processing apparatus for a terminal, according to an exemplary embodiment.

FIG. 13 is a block diagram of an unlock processing apparatus 1300 for a terminal, according to an exemplary embodiment. Referring to FIG. 13, the unlock processing apparatus 1300 further includes a first unlocking module 1008 and a display processing module 1009, in addition to the receiving module 1001, the first determination module 1002, the information acquisition and process module 1003, the second determination module 1005, the unlocking module 1006 as the second unlocking module, and the operation recording module 1007 (FIG. 11).

The first unlocking module 1008 is configured to unlock the terminal, if the current unlocking user belongs to the first preset user group. The display processing module 1009 is configured to display an operation by the unlocking user who does not belong to the first preset user group.

Figure 14:
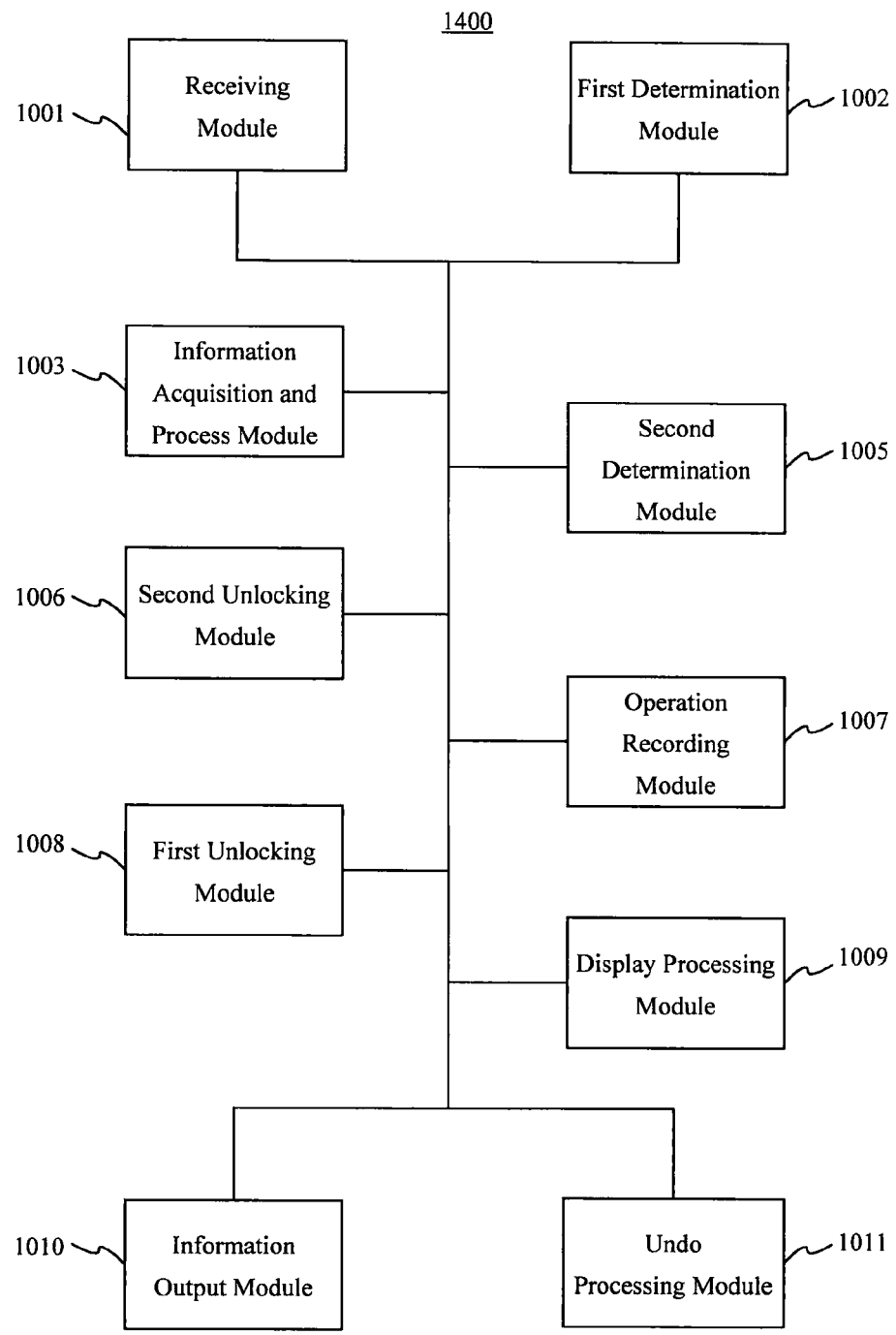
FIG. 14 is a block diagram of an unlock processing apparatus for a terminal, according to an exemplary embodiment.

FIG. 14 is a block diagram of an unlock processing apparatus 1400 for a terminal, according to an exemplary embodiment. Referring to FIG. 14, the unlock processing apparatus 1400 further includes an information output module 1010 and an undo processing module 1011 in addition to the modules of the unlock processing apparatus 1300 (FIG. 13).

The information output module 1010 is configured to output prompt information to prompt whether to undo the recorded operation of a previous unlocking user. The undo processing module 1011 is configured to undo the recorded operation after the prompt information is confirmed.

Referring back to FIG. 9, in exemplary embodiments, the unlock processing apparatus 900 may further include an inclined angle determination module (not shown) and an interface processing module (not shown).

The inclined angle determination module is configured to determine whether to display an unlocking interface according to an inclined angle between a plane where an axis of the terminal is located and a horizontal plane, and determines to display if the inclined angle reaches a preset threshold. The interface processing module is configured to display the unlocking interface based on the determination of the inclined angle determination module.

Figure 15:
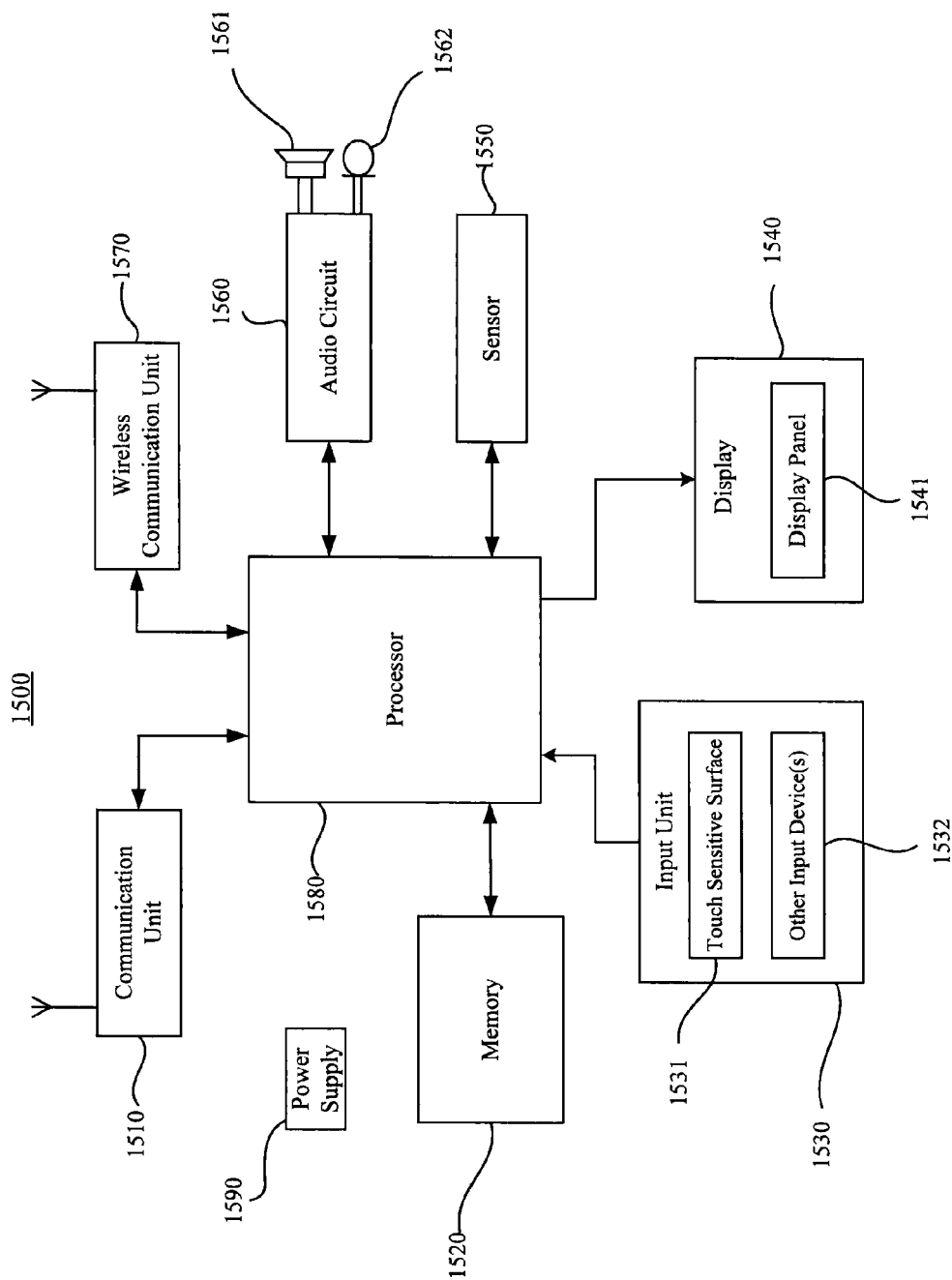
FIG. 15 is a block diagram of a terminal, according to an exemplary embodiment.

FIG. 15 is a block diagram of a terminal 1500, according to an exemplary embodiment. The terminal 1500 is configured to perform any of the above described unlock processing methods, and may be a mobile phone, a tablet computer, a wearable mobile terminal, such as a smart watch, and the like.

Referring to FIG. 15, the terminal 1500 may include one or more of a communication unit 1510, memory resources represented by a memory 1520, an input unit 1530, a display 1540, a sensor 1550, an audio circuit 1560, a wireless communication unit 1570, a processor 1580 including one or more processing cores, and a power supply 1590 and other components. It should be appreciated by those skilled in the art that the structure shown in FIG. 15 does not constitute a limitation to the terminal 1500, and the terminal 1500 may include more or less components than those shown in FIG. 15, or a combination of some of the components, or have different component arrangements.

The communication unit 1510 is configured to transmit and receive signals during transmitting and receiving information or a procedure of calling. The communication unit 1510 may be a network communication device such as a radio frequency (RF) circuit, a router, a modem, etc. For example, when the communication unit 1510 is an RF circuit, the communication unit 1510 receives downlink information from a base station, and then sends the downlink information to the processor 1580 to be processed. Also, the communication unit 1510 transmits uplink data to the base station. Generally, the RF circuit as the communication unit 1510 includes, but is not limited to, an antenna, at least one amplifier, a tuner, one or more oscillators, a subscriber identity module (SIM) card, a transceiver, a coupler, a low noise amplifier (LNA), a duplexer, etc. Furthermore, the communication unit 1510 may communicate with a network and other devices through wireless communication. The wireless communication may use any communication standards or protocols, including but not limited to global system of mobile communication (GSM), general packet radio service (GPRS), code division multiple access (CDMA), wideband code division multiple access (WCDMA), long term evolution (LTE), e-mail, short messaging service (SMS), etc.

The memory 1520 is configured to store software programs and modules. The processor 1580 performs various functional applications and data processing by running the software programs and modules stored in the memory 1520. The memory 1520 may mainly include a program storage area and a data storage area. The program storage area may store an operating system, application programs required by at least one function (such as a function of sound playback, or a function of image playback, etc.). The data storage area may store data created during operation of the terminal 1500 (such as audio data, a phone book, etc.). In addition, the memory 1520 may include a high-speed random access memory and may also include a non-volatile memory. For example, the memory 1520 may include at least one disk storage device, a flash memory device, or other non-volatile solid-state memory devices. Accordingly, the memory 1520 may also include a memory controller to provide access to the memory 1520 performed by the processor 1580 and the input unit 1530.

The input unit 1530 is configured to receive input numbers or characters, and generate input signals through a keyboard, a mouse, a joystick, an optical device, or a trackball related to a user setting and functional control. The input unit 1530 may include a touch sensitive surface 1531 and one or more other input devices 1532. The touch sensitive surface 1531, also known as a touch screen or a track pad, may collect a user's touch operations on or near the touch sensitive surface 1531 (such as an operation performed by the user using any suitable object or accessory such as a finger, a touch pen and the like on or near the touch sensitive surface 1531), and drive a corresponding connected device according to a preset program. For example, the touch sensitive surface 1531 may include first and second parts, i.e., a touch detection device and a touch controller. The touch detection device detects a touching position of the user, detects a signal caused by the touch operation, and transmits the signal to the touch controller. The touch controller receives touch information from the touch detection device, transforms it into coordinates of the touch position, and sends the coordinates to the processor 1580. The touch controller may also receive a command from the processor 1580 and execute the command. In addition, the touch sensitive surface 1531 may be realized in various types, such as a resistive type, a capacitive type, an infrared type, a surface acoustic wave type, etc. In addition to the touch sensitive surface 1531, the input unit 1530 may also include one or more other input devices 1532. The other input device 1532 may include, but is not limited to, one or more of a physical keyboard, functional keys (such as volume control keys, switch buttons, etc.), a trackball, a mouse, and a joystick.

The display 1540 is configured to display information input by the user or information provided for the user and various graphical user interfaces of the terminal 1500. These graphical user interfaces may consist of graphics, texts, icons, videos, and any combination thereof. The display 1540 may include a display panel 1541. The display panel 1541 may be configured with a liquid crystal display (LCD), an organic light-emitting diode (OLED), etc. Further, the touch sensitive surface 1531 may cover the display panel 1541. When a touch operation on or near the touch sensitive surface 1531 is detected by the touch sensitive surface 1531, the touch operation is sent to the processor 1580 to determine a type of the touch operation, and a corresponding visual output will be provided on the display panel 1541 by the processor 1580 according to the type of touch operation. Although in FIG. 15 the touch sensitive surface 1531 and the display panel 1541 are two separate components to realize input and output functions, in some embodiments, the touch sensitive surface 1531 and the display panel 1541 may be integrated to realize input and output functions.

The sensor 1550 may be a light sensor, a motion sensor, or any other sensors. The light sensor may include an ambient light sensor and a proximity sensor. The ambient light sensor may adjust a brightness of the display panel 1541 according to a brightness of the ambient light. The proximity sensor may turn off the display panel 1541 and/or backlight when the terminal 1500 moves close to the user's ear. As an example of the motion sensor, a gravity acceleration sensor may detect accelerations in various directions (e.g., along three axes), and may detect a magnitude and a direction of the gravity when it is stationary. The gravity acceleration sensor may be used in applications for identifying an attitude of the terminal 1500 (such as horizontal and vertical screen switching, related games, attitude calibration of a magnetometer), functions related to vibration recognizing (such as a pedometer, clicking), etc. The terminal 1500 may also be equipped with other sensors such as a gyroscope, a barometer, a hygrometer, a thermometer, an infrared sensor, etc.

The audio circuit 1560 is coupled to a speaker 1561 and a microphone 1562, and may provide an audio interface between the user and the terminal 1500. The audio circuit 1560 may transform received audio data into electrical signals which are transmitted to the speaker 1561 and transformed into sound signals to be output by the speaker 1561. On the other hand, the microphone 1562 transforms collected sound signals into electrical signals which are received and transformed into audio data by the audio circuit 1560. After being output to the processor 1580 to be processed, the audio data is transmitted to, for example, another terminal via the RF circuit 1510, or output to the memory 1520 for further processing. The audio circuit 1560 may also include an earplug jack to allow a communication between an external earphone and the terminal 1500.

The wireless communication unit 1570 may be a wireless fidelity (WiFi) module, which provides the user with a wireless broadband Internet access. Thus, the terminal 1500 allows the user to send and receive emails, browse webpages and access streaming media, etc. through the wireless communication unit 1570. Although FIG. 15 shows the wireless communication unit 1570, it should be appreciated that the wireless communication unit 1570 is not a necessary component of the terminal 1500, and may be omitted.

The processor 1580 is a control center of the terminal 1500 that connects various parts of the terminal 1500 through various interfaces and circuits, performs various functions and data processing by running or executing software programs and/or modules stored in the memory 1520 and by invoking data stored in the memory 1520. For example, the processor 1580 may include one or more processing cores. The processor 1580 may be integrated with an application processor that mainly processes an operating system, user interfaces and/or application programs, and a modem processor that mainly processes wireless communication. In some embodiments, the modem processor may not be integrated into the processor 1580.

The power supply 1590 is configured to supply power to components of the terminal 1500. The power supply 1590 may be logically connected to the processor 1580 through a power supply management system, so as to achieve the functions such as charging, discharging, power consumption management, etc., through the power supply management system. The power supply 1590 may also include one or more components of a direct current (DC) or alternating current (AC) power supply, a recharge system, a power failure detection circuit, a power converter or an inverter, a power status indicator, etc.

Although not shown, the terminal 1500 may also include a camera, a Bluetooth module, etc.

In exemplary embodiments, there is also provided a non-transitory computer readable storage medium including instructions, such as included in the memory 1520, executable by the processor 1580 in the terminal 1500, for performing the above-described unlock processing methods. For example, the storage medium includes, but is not limited to, a disk storage, an optical memory, etc.

One of ordinary skill in the art will understand that the above described modules/units can each be implemented by hardware, or software, a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An unlock processing method for a terminal, comprising:
   receiving an input unlocking instruction from a user;
   determining whether the user belongs to a first preset user group according to the input unlocking instruction;
   if it is determined that the user does not belong to the first preset user group, acquiring and storing information regarding the user;
   determining whether the user belongs to a second preset user group different from the first preset user group, according to the acquired information regarding the user;
   unlocking the terminal to enter a restricted user mode, if it is determined that the user belongs to the second preset user group; and
   recording, after the unlocking, an operation of the user in the restricted user mode;
   wherein, in the restricted user mode, the terminal:
      sets privacy information of the first preset user group stored in the terminal as inaccessible, and
      only responds to one or more operations selected from start, inquiry, modification, addition, and deletion based on an identity of the user; and
   if it is determined that the user, as a current user, belongs to the first preset user group, unlocking the terminal;
      displaying stored information regarding a previous user not belonging to the first preset user group and displaying one or more recorded operations performed by the previous user in the restricted user mode, wherein the stored information and the one or more recorded operations are displayed in a corresponding relationship such that the one or more recorded operations can be managed by the current user based on the stored information, and wherein the one or more recorded operations cause one or more changes to a status of the terminal and cause the terminal to save the one or more changes;
      after the displaying of the one or more recorded operations of the previous user, outputting prompt information to prompt the current user whether to undo the one or more recorded operations, the prompt information including an undo option for undoing all of the one or more recorded operations by pressing one designated key; and
      undoing changes to the status of the terminal that are caused by all of the one or more recorded operations and saved by the terminal, if it is determined that the designated key is pressed.

2. The unlock processing method according to claim 1, wherein the acquiring comprises:
   starting an information acquisition device; and
   acquiring, by the information acquisition device, the information regarding the user, the acquired information including at least one of face image information, voice information, or fingerprint information of the user.

3. The unlock processing method according to claim 1, after the determining of whether the user belongs to the second preset user group, the unlock processing method further comprising:
   entering a locked status if it is determined that the user does not belong to the second preset user group.

4. The unlock processing method according to claim 1, before the receiving of the input unlocking instruction, further comprising:
   determining an inclined angle between a plane where an axis of the terminal is located and a horizontal plane; and
   displaying an unlocking interface to receive the input unlocking instruction, if the determined inclined angle is greater than or equals to a preset threshold.

5. The unlock processing method according to claim 1, wherein the input unlocking instruction is based on at least one of password information, pattern information, face image information, voice information, or fingerprint information of the user.

6. A terminal, comprising:
   a processor; and
   a memory for storing instructions executable by the processor,
   wherein the processor is configured to:
   receive an input unlocking instruction from a user;
   determine whether the user belongs to a first preset user group according to the input unlocking instruction;
   if it is determined that the user does not belong to the first preset user group,
      acquire and store information regarding the user;
      determine whether the user belongs to a second preset user group different from the first preset user group, according to the acquired information regarding the user;
   unlock the terminal to enter a restricted user mode, if it is determined that the user belongs to the second preset user group; and
   record, after the unlocking, an operation of the user in the restricted user mode;
   wherein, in the restricted user mode, the terminal:
      sets privacy information of the first preset user group stored in the terminal as inaccessible, and
      only responds to one or more operations selected from start, inquiry, modification, addition, and deletion based on an identity of the user; and
   if it is determined that the user, as a current user, belongs to the first preset user group, unlock the terminal;
      display stored information regarding a previous user not belonging to the first preset user group and display one or more recorded operations performed by the previous user in the restricted user mode, wherein the stored information and the one or more recorded operations are displayed in a corresponding relationship such that the one or more recorded operations can be managed by the current user based on the stored information, and wherein the one or more recorded operations cause one or more changes to a status of the terminal and cause the terminal to save the one or more changes;
      after the displaying of the one or more recorded operations of the previous user, output prompt information to prompt the current user whether to undo the one or more recorded operations, the prompt information including an undo option for undoing all of the one or more recorded operations by pressing one designated key; and undo changes to the status of the terminal that are caused by all of the one or more recorded operations and saved by the terminal, if it is determined that the designated key is pressed.

7. The terminal according to claim 6, further comprising: an information acquisition device, wherein the processor is further configured to:

start the information acquisition device if it is determined that the user does not belong to the first preset user group, wherein the information acquisition device is selected from a camera, a microphone, or a fingerprint recording device; and cause the information acquisition device to acquire the information regarding the user, the acquired information including at least one of face image information, voice information, or fingerprint information of the user.

8. The terminal according to claim 6, after the determining of whether the user belongs to the second preset user group, the processor being further configured to:

cause the terminal to enter a locked status if it is determined that the user does not belong to the second preset user group.

9. The terminal according to claim 6, before the receiving of the input unlocking instruction, the processor being further configured to:

determine an inclined angle between a plane where an axis of the terminal is located and a horizontal plane; and display an unlocking interface to receive the input unlocking instruction, if the determined inclined angle is greater than or equals to a preset threshold.

10. The terminal according to claim 6, wherein the processor receives the input unlocking instruction based on at least one of password information, pattern information, face image information, voice information, or fingerprint information of the user.

11. A non-transitory storage medium having stored therein instructions that, when executed by a processor of a terminal, cause the terminal to perform an unlock processing method, the method comprising:

receiving an input unlocking instruction from a user;

determining whether the user belongs to a first preset user group according to the input unlocking instruction;

if it is determined that the user does not belong to the first preset user group, acquiring and storing information regarding the user;

determining whether the user belongs to a second preset user group different from the first preset user group, according to the acquired information regarding the user;

unlocking the terminal to enter a restricted user mode, if it is determined that the user belongs to the second preset user group; and recording, after the unlocking, an operation of the user in the restricted user mode;

wherein, in the restricted user mode, the terminal:

sets privacy information of the first preset user group stored in the terminal as inaccessible, and only responds to one or more operations selected from start, inquiry, modification, addition, and deletion based on an identity of the user; and if it is determined that the user, as a current user, belongs to the first preset user group, unlocking the terminal;

displaying stored information regarding a previous user not belonging to the first preset user group and displaying one or more recorded operations performed by the previous user in the restricted user mode, wherein the stored information and the one or more recorded operations are displayed in a corresponding relationship such that the one or more recorded operations can be managed by the current user based on the stored information, and wherein the one or more recorded operations cause one or more changes to a status of the terminal and cause the terminal to save the one or more changes;

after the displaying of the one or more recorded operations of the previous user, outputting prompt information to prompt the current user whether to undo the one or more recorded operations, the prompt information including an undo option for undoing all of the one or more recorded operations by pressing one designated key; and undoing changes to the status of the terminal that are caused by all of the one or more recorded operations and saved by the terminal, if it is determined that the designated key is pressed.

* * * * *